US008412822B1

(12) United States Patent
Weinman, Jr.

(10) Patent No.: US 8,412,822 B1
(45) Date of Patent: Apr. 2, 2013

(54) OPTIMIZED JOB SCHEDULING AND EXECUTION IN A DISTRIBUTED COMPUTING GRID

(75) Inventor: Joseph B. Weinman, Jr., Basking Ridge, NJ (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 1167 days.

(21) Appl. No.: 10/765,674

(22) Filed: Jan. 27, 2004

(51) Int. Cl.
*G06F 15/173* (2006.01)
(52) U.S. Cl. ......... 709/225; 709/201; 709/202; 709/226
(58) Field of Classification Search .................. 709/248, 709/238, 201, 202, 226; 705/1
See application file for complete search history.

(56) References Cited

U.S. PATENT DOCUMENTS

| | | | |
|---|---|---|---|
| 6,278,901 B1 * | 8/2001 | Winner et al. ................. | 700/99 |
| 6,460,082 B1 | 10/2002 | Lumelsky et al. | |
| 7,103,628 B2 * | 9/2006 | Neiman et al. ................ | 709/201 |
| 7,140,019 B2 * | 11/2006 | May et al. ..................... | 718/102 |
| 2003/0120708 A1 | 6/2003 | Pulsipher et al. | |
| 2004/0003077 A1 | 1/2004 | Bantz et al. | |
| 2004/0064633 A1 * | 4/2004 | Oota ............................ | 711/100 |
| 2004/0230455 A1 * | 11/2004 | McKinney et al. ............. | 705/1 |

OTHER PUBLICATIONS

Cao et al. "GridFlow: workflow management for Grid computing", Cluster Computing and the Grid 2003. Proceedings. CCGrid 2003. #rd IEEE/ACM International Symposium on: Publication Date May 12-15, 2003.*

* cited by examiner

*Primary Examiner* — Adnan Mirza
(74) *Attorney, Agent, or Firm* — Hanley, Flight and Zimmerman, LLC (57) ABSTRACT

An arrangement provides optimal job scheduling in a distributed computing grid having a network of nodes. As jobs enter the system, their requirements are matched against the capabilities at each node to determine (step 202) candidate nodes. From this set of candidate nodes, a subset of valid nodes is selected (step 204) that has sufficient bandwidth for the duration of the job on each link that will need to be used by the job if run at that candidate node. For each valid node, a total cost is computed (step 206) to run the job. The cost may include such factors as bandwidth cost, server cost, storage cost, delay costs, and the like. Finally, a lowest cost node is selected (step 207), and the job is scheduled for execution (step 208) and then run (step 209) on that lowest cost node. An arrangement combining job scheduling with bandwidth on demand (BoD) involves a system for scheduling at least one job for execution on a network of nodes joined by links having respective link capacities, each job associated with a transport capacity requirement. The system has a job scheduler (element 150) configured to schedule the at least one job to be executed on at least one selected node, and a link manager (element 140) configured to reserve at least some of the link capacity of at least one of the links connected to the at least one selected node, to match the job transport capacity requirement.

21 Claims, 2 Drawing Sheets

OPTIMIZED JOB SCHEDULING AND EXECUTION IN A DISTRIBUTED COMPUTING GRID

BACKGROUND OF THE INVENTION

1. Field of the Invention

This invention relates to data processing in general, and specifically to arrangements for optimizing job scheduling and execution in a distributed computing grid.

2. Related Art

In traditional data processing environments, a set of servers (i.e., computers, such as mainframes, midrange processors, blade servers, and the like) interact with storage (such as disk, tape, or network-attached storage) on a dedicated basis to process compute jobs such as payroll, e-commerce, billing, and so forth. Additional elements, such as firewalls, load balancers, Local Area Networks, Storage Area Networks, and the like, are also typically engaged. For example, servers A, B, and C may be dedicated to a payroll application, servers D, E, and F may be dedicated to customer technical support, and servers G, H, and I may be dedicated to web applications.

A limitation of this conventional approach is that the capacity dedicated to individual applications may be too little or too great at any given time. If the capacity is too great, it means that the owner of this infrastructure may have overpaid for the hardware and software comprising the data processing environment. If it is too little, it means that the application may not meet performance objectives such as the number of simultaneous users supported, throughput, response time and latency, or the like.

An emerging approach is called "grid computing." Grid computing typically involves a number of geographically dispersed compute nodes. If an application needs to be run, and capacity of the appropriate type and configuration is available at one of the nodes, the job is scheduled to run at that node. A problem with this conventional job scheduling approach is that it ignores network considerations, except for the availability of a basic connectivity path to the node.

Consequently, the inventor has realized that, even though it may be true that a node has available capacity, it may not be the best node for the job, due to the total costs involved in moving the application and the data required for the application, and additional data, packets, or transactions as the job runs. These costs include the cost of transport, as well as the cost of delays due to bandwidth that may be insufficient to move the data to the node on a timely basis. These delay costs can be quantified due to user dissatisfaction, regulatory requirements and financial penalties, competitive needs, job deadlines, and so forth.

Moreover, conventional grid environments typically provision large fixed-bandwidth connections between nodes, for example, several Gigabit Ethernet or even several 10 Gigabit Ethernet connections are used in the TeraGrid backbone sponsored by the National Science Foundation. Much of the time, most of this capacity is unused, and consequently, users or firms may overpay for unused capacity.

It would be economical to utilize a switched line and pay only for needed service, rather than lease an expensive dedicated but underused line. In this regard, emerging technologies permit bandwidth to be allocated "on demand" on a link or end-to-end basis. Bandwidth on demand (BoD) is sometimes called (or is closely related to) dynamic bandwidth allocation, load balancing, committed information rates, rate shaping, quality of service (QoS) management, traffic management, traffic engineering, bandwidth minimums, bandwidth maximums, and the like. As generally understood and broadly used here, BoD temporarily flexibly provides capacity on a link to accommodate changes in the volume (e.g., packets or megabits per second) or characteristics (e.g., jitter, packet loss) of demand, the capacity being dynamically increased or decreased as specified through a control interface. A typical BoD implementation involves a router (or other network element as a switch, optical add/drop multiplexer, and the like) with the capability to perform the bandwidth allocation. Such routers can also be directed to establish or otherwise support the establishment of logical links on demand to provide more capacity (subject to the ultimate physical capacity of a link), and then be directed to dissolve the link as the traffic demand withdraws. The network element is typically coupled with a higher level entity, such as a software policy management layer, that tells the network element what to do. Various ways are known in the art to implement BoD, but none appear to be linked to or combined with scheduling jobs on nodes on the network.

What is needed in the art is way for a grid computing environment job scheduler to synergetically interoperate with such network functionality to optimize the overall performance and cost of distributed computing.

SUMMARY

The invention provides a system for scheduling at least one job for execution on a network of nodes joined by links. The system has (a) a job planner including (a1) a validity portion configured to determine the nodes' ability to run the one or more jobs at a given time and (a2) a cost portion configured to determine costs to run the at least one job at respective nodes at a given time. The system also has (b) a job scheduler configured to cooperate with the validity portion and the cost portion so as to determine at least one optimum node that is able to run the at least one job and that has a lowest cost.

Additionally, the invention provides a method for scheduling at least one job for execution on at least one optimum node in a network of nodes connected by links. The method involves determining which nodes are capable of running the at least one job, analyzing measures of total cost associated with execution of the at least one job on respective nodes that were determined to be capable of running the at least one job, and based on a measure of least total cost, selecting the at least one optimum node for running the at least one job.

Further, an arrangement combining job scheduling with bandwidth on demand (BoD) involves a system for scheduling at least one job for execution on a network of nodes joined by links having respective link capacities, each job associated with a transport capacity requirement. The system has a job scheduler configured to schedule the at least one job to be executed on at least one selected node, and a link manager configured to reserve at least some of the link capacity of at least one of the links connected to the at least one selected node, to match the job transport capacity requirement.

BRIEF DESCRIPTION OF THE DRAWINGS

A more complete appreciation of the described embodiments is better understood by reference to the following Detailed Description considered in connection with the accompanying drawings, in which like reference numerals refer to identical or corresponding parts throughout, and in which.

DETAILED DESCRIPTION

In describing embodiments illustrated in the drawings, specific terminology is employed for the sake of clarity. However, the invention is not intended to be limited to the specific terminology so selected, and it is to be understood that each specific element includes all technical equivalents that operate in a similar manner to accomplish a similar purpose. Various terms that are used in this specification are to be given their broadest reasonable interpretation when used to interpret the claims.

Moreover, features and procedures whose implementations are well known to those skilled in the art are omitted for brevity. For example, initiation and termination of loops, and the corresponding incrementing and testing of loop variables, may be only briefly mentioned or illustrated, their details being easily surmised by skilled artisans. Thus, the steps involved in methods described herein may be readily implemented by those skilled in the art without undue experimentation.

Further, various aspects, features and embodiments may be described as a process that can be depicted as a flowchart, a flow diagram, a structure diagram, or a block diagram. Although a flowchart may describe the operations as a sequential process, many of the operations can be performed in parallel, concurrently, or in a different order than that described. Operations not needed or desired for a particular implementation may be omitted. A process or steps thereof may correspond to a method, a function, a procedure, a subroutine, a subprogram, and so forth, or any combination thereof.

As background, various terms and concepts are explained, with the understanding that the scope of the claims should not be limited by particular explanations or embodiments. A network includes a group of nodes with potentially varied capabilities connected by links. Each node has specific fixed capacity and capabilities, e.g., 12 servers with the ability to run a particular operating system, 3.7 Terabytes of enterprise storage, 2 routers with a Terabit of bandwidth each, and so forth. Each link has specific capabilities and capacity, e.g., four 10 Gigabit Ethernet service channels.

Each link may have capacity that may be subdivided into logical links with corresponding bandwidth allocations for different purposes. For example, a physical capacity of 10 gigabits per second may be allocated as 10 gigabits to customer or application A, or possibly 2 gigabits per second to customer A and 8 gigabits per second to customer B, or 1 gigabit per second to each of 10 customers or applications, and so forth. These logical or virtual link bandwidth amounts may be adjusted upward or downward, with such allocations occurring dynamically over time periods of weeks, days, hours, minutes, or even seconds. When a job is to be run, the method described below determines an optimal valid node, reserves link and node capabilities at a given capacity, and schedules and executes the job at the optimal valid node.

In general, we use terms such as "job," "node," and "run" very generally and expansively. For example, a job may be a processor intensive, data intensive activity, such as seismic analysis for petroleum exploration, which involves large data sets requiring substantial storage, and high speed CPUs. Another job may be a processor-intensive activity that does not require any data storage, such as testing a large number to see if it is prime. Or it may be a data intensive activity that does not require any processors, such as storing a large data set for archival purposes for seven years on tape or content-addressed storage. Nodes may have general purpose capability, including processing on a variety of computing platforms, operating system, and middleware configurations, disk storage, tape storage, and the like, or may have somewhat limited capabilities, for example, a node may not have capability to process or store data, but may be a network hub that switches and routes traffic destined for other nodes. Thus, we use the term "run" to mean using resources at a node over time consonant with the objectives of the job. Consequently, storing data in a tape silo is considered to be an example of "running" a job, the same way as "running" an application by executing it in a processing environment.

In the method described herein, first the requirements of the job may be determined relative to the capabilities of each node. In practice, e.g., a specific job may require the Solaris 8.0 operating system and a SunFire 15K computer, available from Sun Microsystems of Menlo Park, Calif., but a particular node may only have a configuration and capability available to run the MVS operating system on a zSeries computer available from International Business Machines of Armonk, N.Y. Even if a SunFire 15K were physically present, it may not have capacity available within a reasonable planning/scheduling window. A set of candidate nodes may be determined by examining all nodes in the system, and evaluating whether they have the capability and the capacity over time to run the job. By "over time," we mean examining whether that capacity will continue to exist for the expected duration of the job, based on a schedule of jobs starting and completing and thus acquiring and releasing capacity.

Once a set of candidate nodes have been determined, for each candidate node, it is determined whether there is the right link capability and capacity available, were the compute job to be run at that candidate node. Capability and capacity may include specific protocols, quality of service, bandwidth, and the like. Link bandwidth is required for a variety of reasons. Data needed to run the job may be in one or more locations in the system, and at the beginning of the job, or as the job proceeds, data sets may need to be transferred or accessed. Active end-users may exist either at various nodes or may access the system through various nodes. Some of the candidate nodes may be ruled out at this stage, due to a lack of link capability and capacity. This determines a set of valid nodes. Due to capabilities required and capacity needed, there may not be any candidate nodes; and even if there are, there may not be any valid nodes.

If there are not any valid nodes, the method stops. If there are valid nodes, the method continues, finding an optimal valid node. Such an optimal valid node (there may be more than one) is selected based on picking one with the lowest total cost. Such a cost may be determined based on one or more factors, including:
 the cost of the CPU,
 the cost of the storage,
 the cost of the network,
 the cost of delaying the job, and/or
 other factors not specifically listed here.

Once an optimal valid node is selected, the compute, storage, network, and/or other capacity are reserved for the duration of the job in accordance with the requirements of the job, and the job is executed at the selected optimal valid node.

Figure 1A:
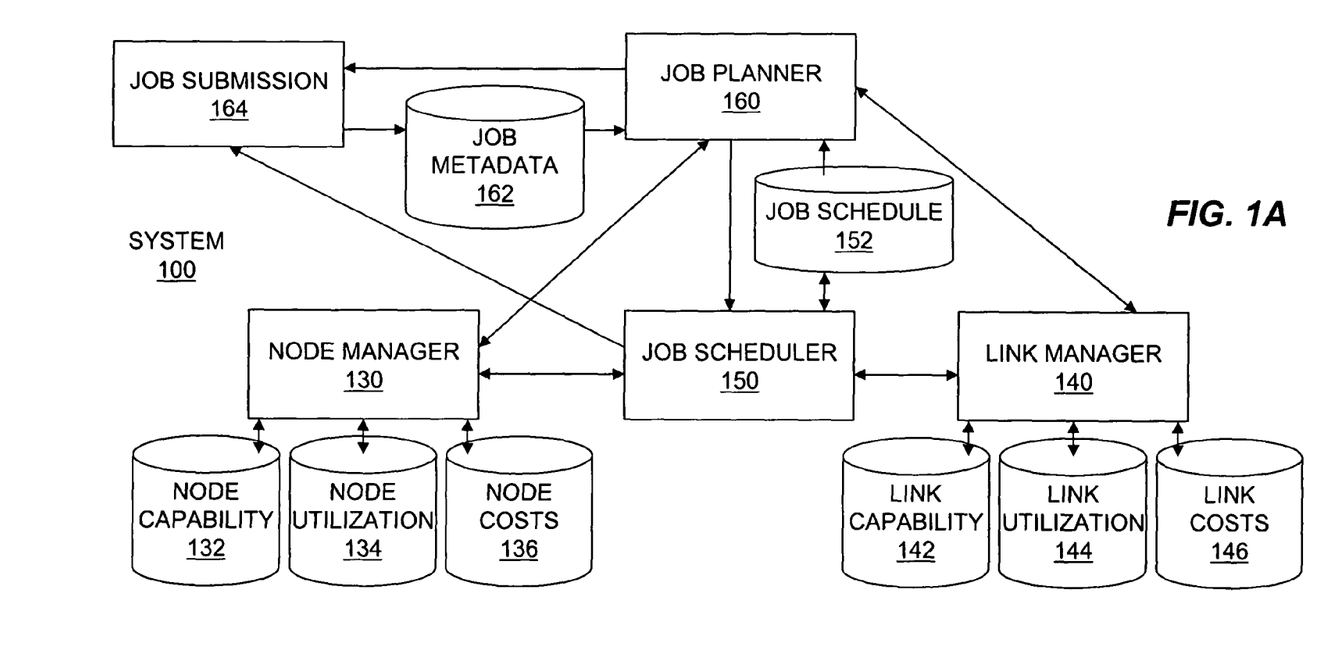
FIGS. 1A and 1B (which may collectively be referred to as "FIG. 1") respectively illustrate an embodiment of a job scheduling and execution system and a network of nodes and links.
Figure 1B:
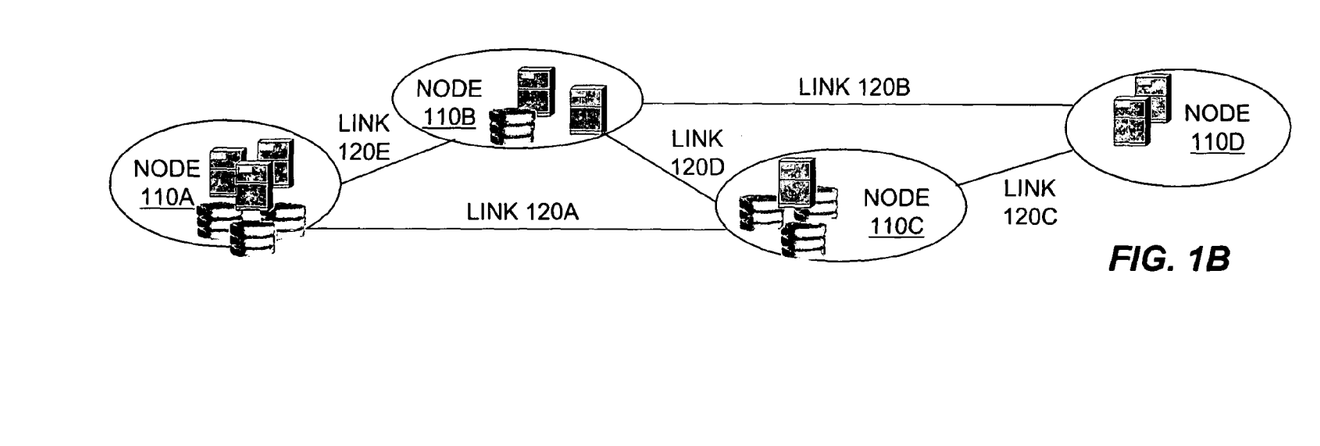

One embodiment of a system involves several elements operating with respect to a network of nodes connected by links, shown schematically in FIGS. 1A and 1B:
 Nodes 110A through 110D, which are physical entities at specific geographic locations comprising zero or more components such as processors, storage, security elements, and network elements such as routers, switches, gateways, etc.

Links 120A through 120E, which are physical entities connecting pairs of nodes, made up of zero or more service channels of various capacity supporting one or more network protocols, such as TCP/IP, Fibre Channel, ESCON, and the like.

A node capability database 132, maintaining information, including capacity, about the number and type of components at each node.

A node utilization table 134, showing planned utilization over time of each component at each node in accordance with a job schedule.

A node cost table 136, maintaining information on the cost (or price) to use each component at each node over time. Equivalently, the node cost table may be viewed from a service-oriented perspective where rather than providing static cost structure, dynamic pricing information may be presented.

A link capability database 142, maintaining information, including capacity, about the number and type of service channels in each link.

A link utilization table 144, showing planned utilization over time of each service channel of each link in accordance with a job schedule.

A link cost table 146, maintaining information on the cost (or price) to use each service channel on each link over time. Equivalently, the link cost table may be viewed from a service-oriented perspective where rather than providing static cost structure, dynamic pricing information may be presented or accessed.

A node manager 130, which provides access to information contained in the node capability database, the node utilization table, and the node cost table, and allows new capability utilization plans to be scheduled and overlaid on the existing node utilization plan contained in the node utilization table.

A link manager 140, which provides access to information contained in the link capability database, the link utilization table, and the link cost table, and allows new capability utilization plans to be scheduled and overlaid via updating the link utilization table.

A job schedule 152, which has a list of each job to be run, and the planned nodes and links to be (at least partially) utilized by each job over time.

Job metadata 162, which includes all relevant information concerning the job, such as the environment needed for running the job, priority, required start, planned utilization of resources over time, required latencies.

A job planner 160, which, given a new job to be run and its associated requirements, determines whether there are any nodes in the system that can run it, and if so, the lowest total cost node and associated links.

A job submission module 164, that accepts jobs to be submitted, and either reports back that they cannot be run due to lack of resources or reports their status and or completion.

A job scheduler 150, which then adds the job to the job schedule, updates the node utilization table and link utilization table, and causes the job to execute at the correct time at the planned node.

Briefly, a group of physical sites (and intermediate network nodes) are connected by network links. A link manager 140 monitors status of the network, maintains inventory concerning links and topology information, and can dynamically allocate bandwidth and associated quality of service to specific purposes subject to the ultimate physical limits of each connection, which are based on capacity of the underlying medium and the specific optoelectronics in the network elements provisioned into the network. The link manager 140 can also maintain and communicate cost information regarding each link, which may be somewhat static, e.g., so many dollars per gigabit of bandwidth from point a to point b, or may be dynamic, e.g., $1.23 per gigabit of bandwidth this second, and $1.76 per gigabit of bandwidth this next second, and $1.54 per gigabit of bandwidth this next second, and so on second by second, minute by minute.

Job scheduler 150 maintains a list of jobs to be run. Typically, this list changes, as jobs complete, or new jobs to be run are added. When a job is to be run, the job scheduler 150 acquires or determines information concerning:

the priority of the job,
the CPU and storage requirements for the job,
specific environment requirements (e.g., operating system),
network access requirements, and/or
other considerations not specifically listed.

The job scheduler then may use any of a variety of algorithms or heuristics to determine the order in which jobs will be run, such as, for example:

"First Come, First Serve,"
"Shortest Job First,"
"First Fit,"
priority queuing, and/or
other approaches not specifically listed.

When a job is to be run, a location is determined that meets requirements such as:

available capacity,
specific environment, and/or
other requirements not specifically listed.

If more than one location will serve, the location is selected based on minimizing a total cost function. The total cost function may be based on one or more considerations such as:

costs for servers,
costs for CPU capacity,
costs for storage,
costs for security elements such as firewalls,
costs for network bandwidth,
delay due to node availability or latency, and/or
other costs not specifically listed.

With this background in mind, reference is now made to FIG. 1 for a more detailed explanation.

System 100 operates with respect to nodes 110$x$, shown here as nodes 110A, 110B, 110C, and 110D, although the actual number may be greater or lesser, as well as links 120$x$, shown here as links 120A, 120B, 120C, 120D, and 120E, although the actual number may be greater or lesser. Links 120$x$ can transport voice, data, video and/or other traffic between nodes 110$x$.

Each node 110$x$ may have a variety of resources, shown in the illustration in exemplary fashion as servers and storage, although many different types of resources may exist.

For all nodes 110$x$, and resources within each node, a variety of data is maintained. This includes node capability table 132, node utilization table 134, and node cost table 136.

A portion of node capability table 132 is illustrated in simplified exemplary fashion in Table 1. Briefly, for each node, information about the capabilities and capacity of the node is present.

TABLE 1

Node Capability Table 132

| NODE | ELEMENT | CONFIGURATION | CAPACITY | STATUS |
|---|---|---|---|---|
| Chicago | Itanium Linux Cluster A | 8-way with Oracle 9i | 2 GigaFLOPs | On-Line |
| Chicago | zSeries Enterprise Server | DB2 | 1.35 GigaFLOPs | On-Line |
| Chicago | EMC Symmetrix DMX | Mirrored | 16 TB | On-Line |
| Atlanta | EMC Celerra | NFS | 4.3 TB | Routine Maintenance |

Specifically, the table contains information about nodes, the servers, storage, or other relevant resources, the configuration of those elements, raw capacity, and status. Additional information such as software or firmware revision levels, security level, costs for use of the capacity, cost/pricing models, and so forth may be present as well.

A portion of node utilization table 134 is illustrated in simplified exemplary fashion in Table 2.

TABLE 2

Node Utilization Table 134

| NODE | JOB | START DATE/ TIME | END DATE/ TIME | RESOURCE | CAPACITY RESERVED |
|---|---|---|---|---|---|
| Chicago | 33 | Apr. 25, 2004, 8:43:00 AM | Apr. 28, 2004, 9:15:66 PM | Itanium Linux Cluster A | .3 GigaFLOPs |
| Chicago | 137 | Apr. 27, 2004, 8:43:00 AM | Apr. 28, 2004, 9:15:22 PM | Itanium Linux Cluster A | .5 GigaFLOPs |
| Chicago | 22 | Apr. 28, 2004, 8:43:00 AM | Apr. 28, 2004, 9:15:30 PM | EMC Symmetrix DMX | .4 Terabytes |

Specifically, the table contains information about the amount and type of node capacity reserved by each job, and the start date and time and end date and time of the reservation. Alternative embodiments of this table and accompanying derivative data are within the scope and spirit of the present invention. For example, the table may be viewed as an aggregate set of data representing aggregate utilization percentages across all jobs. Consequently, the table may also be visualized as shown below in Table 3.

TABLE 3

Node Utilization Table 134

TIME ->

An exemplary embodiment of a portion of node cost table 136 is shown below in Table 4.

TABLE 4

Node Cost Table 136

| NODE | RESOURCE | COST |
|---|---|---|
| Chicago | Itanium Linux Cluster A | $.30/second per GigaFLOP |
| Chicago | EMC Symmetrix DMX | $.27/second per TB |
| Atlanta | Sun Fire 15K with Solaris 8.0 | $.37/second per Server Power Unit |
| Atlanta | HDS Lightning 9900 | $.17/second per TB |

Specifically, the table contains cost information associated with the use of the node resource. Although the exemplary table shown above illustrates static costs, they may vary, e.g., 27 cents from 9 AM to 5 PM ET, and 15 cents otherwise. These costs may also be dynamic, changing through the actions of a dynamic pricing system (not shown) which may be used in combination with the present system.

Links 120x may use any of a number of technologies as are known in the art, e.g., electrical, optical, wireless, free space optics, etc., leveraging dense wave division multiplexing, SONET, frame relay, asynchronous transfer mode, IP, SNA, fibre channel, Ethernet, Resilient Packet Ring, etc. arranged into any of a number of architectures and topologies, e.g., point-to-point, ring, dual diverse routed path, mesh, hub, dual hub, counter-rotating rings, etc. Here, the links 120x are shown as logical point-to-point connections.

For all links 120x, a variety of data is maintained, including link capability database 142, link utilization table 144, and link cost table 146.

An exemplary embodiment of a portion of link capability database 142 is shown below in Table 5.

TABLE 5

Link Capability Database 142

| LINK | SERVICE CHANNEL PROTOCOL | BANDWIDTH/ THROUGHPUT (Mb/S) |
|---|---|---|
| Chicago - Atlanta | Gigabit Ethernet | 80000 |
| Chicago - Atlanta | Fibre Channel | 80000 |
| Chicago - Los Angeles | ESCON | 80000 |
| Atlanta - Los Angeles | ATM | 80000 |

Specifically, the table contains capacity information about links between nodes. E.g., as shown, the link between Chicago and Atlanta has a number of Gigabit Ethernet connections for a total link capacity of 80 Gigabits. Optionally and advantageously, additional information, such as the fact that the 80 Gb/S link capacity is made up of 32 service channels each operating at 2.5 Gb/S (OC48), whether the link is up or down, whether service channels are up or down, specific vendor information, patch panel details, network element configurations, topologies for complexes of network elements, and the like may also be maintained.

Link utilization table 144 contains data on planned utilization in accordance with scheduled jobs. An exemplary embodiment of a portion of link utilization table 144 is shown below in Table 6.

TABLE 6

Link Utilization Table 144

| LINK | JOB | START DATE/ TIME | END DATE/ TIME | PROTOCOL | BANDWIDTH RESERVED (Mb/S) |
|---|---|---|---|---|---|
| Chicago - Atlanta | 33 | Apr. 25, 2004, 8:43:00 AM | Apr. 28, 2004, 9:15:66 PM | Gigabit Ethernet | 35 |
| Chicago - Atlanta | 137 | Apr. 27, 2004, 8:43:00 AM | Apr. 28, 2004, 9:15:22 PM | Fibre Channel | 57 |
| Chicago - Los Angeles | 22 | Apr. 28, 2004, 8:43:00 AM | Apr. 28, 2004, 9:15:30 PM | ESCON | 23 |
| Chicago - Los Angeles | 43 | Apr. 27, 2004, 8:43:17 AM | Apr. 28, 2004, 9:15:55 PM | ESCON | 34 |
| Atlanta - Los Angeles | 46 | Apr. 27, 2004, 8:43:17 AM | Apr. 28, 2004, 9:15:55 PM | ATM | 100 |

Specifically, the table contains information about the amount of link capacity reserved by each job, the start date and time and end date and time of the reservation, and the amount of facility bandwidth already reserved by scheduled jobs. Alternative embodiments of this table and accompanying derivative data are within the scope and spirit of the present invention. For example, the table may be viewed as an aggregate set of data representing aggregate utilization percentages across all jobs. Consequently, the table may also be visualized as shown below in Table 7.

TABLE 7

Link Utilization Table 144

| LINK | PROTOCOL | BANDWIDTH RESERVED (Mb/S) |
|---|---|---|
| Chicago-Atlanta | Gigabit Ethernet | |
| Chicago-Atlanta | Fibre Channel | |
| Chicago-Los Angeles | ESCON | |
| Atlanta-Los Angeles | ATM | |

An exemplary embodiment of a portion of link cost table 146 is shown in Table 8.

TABLE 8

Link Cost Table 146

| LINK | SERVICE CHANNEL PROTOCOL | COST |
|---|---|---|
| Chicago - Atlanta | Gigabit Ethernet | $.30/second per Mb/S |
| Chicago - Atlanta | Fibre Channel | $.27/second per Mb/S |
| Chicago - Los Angeles | ESCON | $.37/second per Mb/S |
| Atlanta - Los Angeles | ATM | $.17/second per Mb/S |

Specifically, the table contains cost information associated with the use of the link. Although the exemplary table shown above illustrates static costs, they may vary, e.g., 27 cents from 9 AM to 5 PM ET, and 15 cents otherwise. These costs may also be dynamic, changing through the actions of a dynamic pricing system (not shown) which may be used in combination with the present system.

Node manager 130 enables access to node capability table 132, node utilization table 134, and node cost table 136. This access includes read access, as well as the ability to update the data contained in these tables. Similarly, link manager 140 enables access to link capability database 142, link utilization table 144, and link cost table 146. This access also includes read access, as well as the ability to update the data contained in these tables.

Jobs are submitted via job submission module 164. This creates an entry in job metadata table 162, comprising metadata concerning the job, such as a job ID, a priority, capabilities and capacity required by the job, e.g., 12 mainframe class servers running MVS, 3 servers running Linux and the Apache web server, and 50 Terabytes of enterprise storage.

A job planner 160 interacts with node manager 130 and link manager 140 to determine an optimal node to run the job, and then interacts with job scheduler 150 to schedule the job to run with the selected resources.

Job scheduler 150 then causes the job to be run at the specified location at the specified time for the specified duration. Prior to execution, during execution, and after completion, job scheduler 150 may report the status of the job to job submission module 164.

Figure 2:
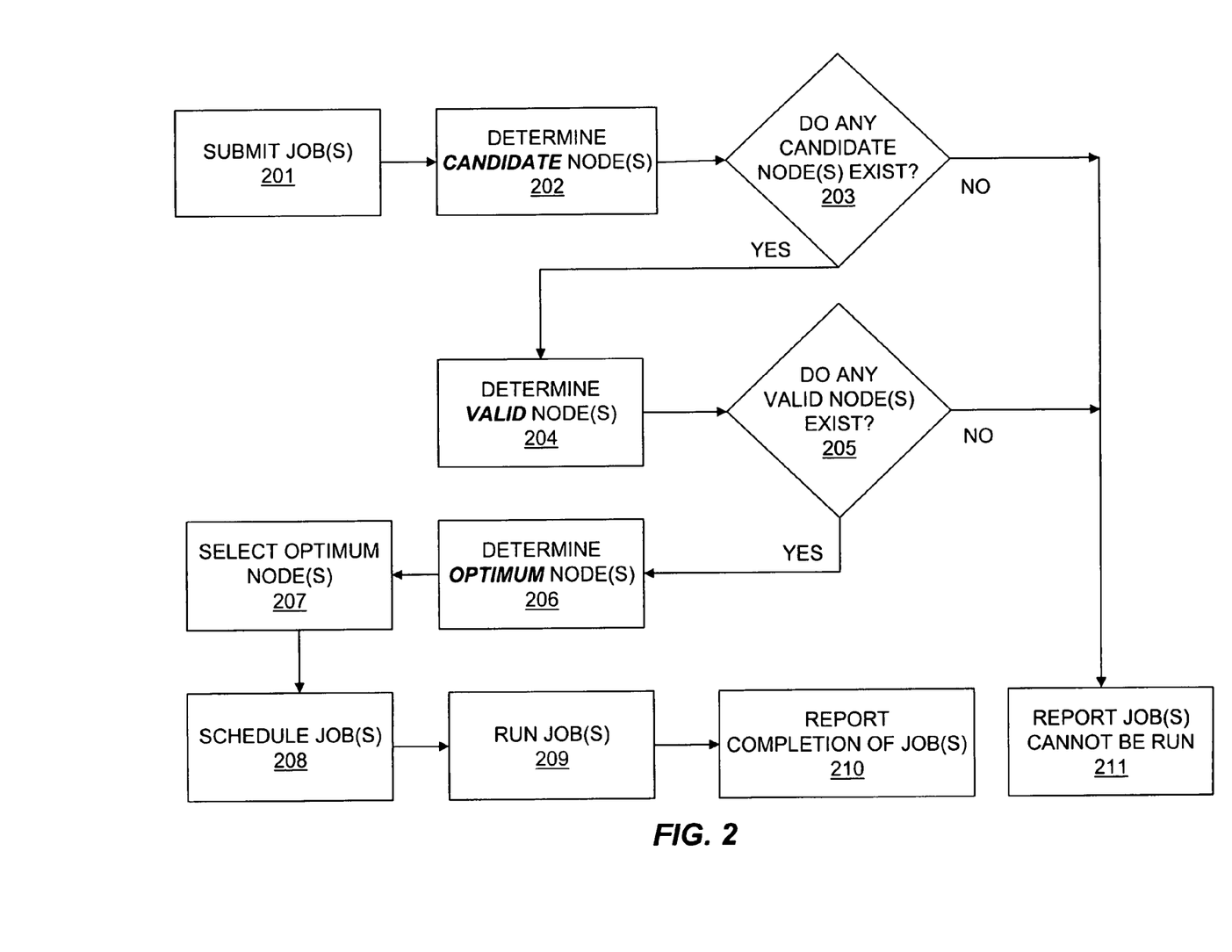
FIG. 2 illustrates an embodiment of a job scheduling and execution method.

FIG. 2 illustrates an embodiment of a job scheduling and execution method.

In step 201, a job is submitted. Metadata concerning the job, such as priority, start time, required completion times, environment/resource characteristics/capabilities/capacity required, access bandwidth characteristics, and the like may be provided as part of this metadata, or optionally in certain alternate embodiments, determined from the metadata provided.

In step 202, a set of candidate nodes is determined where the remaining (unallocated) capacity of the capabilities required by the job of the node is sufficient.

In step 203, it is determined whether the set of candidate nodes is empty. If there are no candidate nodes, the method continues on to step 211 where it is reported back that the submitted job cannot be run due to lack of candidate nodes. However, if there are one or more candidate nodes, the method continues to step 204.

In step 204, a subset of candidate nodes is determined where bandwidth capabilities of the links feeding the node are determined, possibly including a multiplicity of alternate routes to the node. Methods known in the art, such as min cut/max flow may be used to determine the sufficiency of bandwidth. This subset of nodes meeting node and link requirements, over time, is considered to be the set of valid nodes.

Various start times may be considered in accordance with metadata provided for the job, based on the potentially variable availability of capacity of required node and link capabilities, and the potentially variable job requirements for node and link capabilities.

In step 205, if no valid nodes exist, the method continues on to step 211 where it is reported back that the submitted job cannot be run due to lack of valid nodes. However, if one or more valid nodes do exist, the method continues to step 206.

In step 206, the valid node(s) are examined in turn to determine the one or more optimal nodes. Optimal nodes are those where, if the job were to run at the node, the "total cost" of running the job is minimized. In one embodiment, this "total cost" may be determined with respect to the cost of all node and link resources engaged (which may be variably or dynamically priced), and other cost considerations (such as delay costs and so forth).

There may be more than one optimal node, i.e., there may be two or more nodes with the same minimal cost to run the job. This may be so due to sameness of cost drivers, e.g., CPU, storage, software, and bandwidth costs may be the same. However, even when drivers are different the total cost may be the same. E.g., to run the job at node A, the CPU and storage costs may be low, but the network costs high. At node B, the CPU and storage costs may be high, but the network costs may be low.

In any event, in step 207 one of the one or more optimal nodes is selected. This may be done at random, or based on other factors, such as the desire to load balance, or a preference for a particular site or sites.

In step 208, the job is scheduled. That is, a firm start time at the selected node is defined in accordance with the analysis done in steps 202 and 204, and node and link resources are committed and reserved for the job. Planned utilization of these resources is incremented accordingly.

In step 209, when the start time is reached, the job is actually run at the selected node with the selected resources, until the job completes at step 210, at which point completion of the job is reported.

Also provided, for the methods described herein, are computer program products (such as storage media) storing program instructions for execution on a computer system having at least one data processing device, which instructions when executed by the computer system cause the computer system to perform the methods described herein.

Further provided are systems for performing the methods described herein, the systems including at least one data processing element. Generally, these data processing elements may be implemented as any appropriate computer(s) employing technology known by those skilled in the art to be appropriate to the functions performed. The computer(s) may be implemented using a conventional general purpose computer programmed according to the foregoing teachings, as will be apparent to those skilled in the computer art. Appropriate software can readily be prepared by programmers based on the teachings of the present disclosure. Suitable programming languages operating with available operating systems may be chosen.

General purpose computers may implement the foregoing methods, in which the computer housing may house a CPU (central processing unit), memory such as DRAM (dynamic random access memory), ROM (read only memory), EPROM (erasable programmable read only memory), EEPROM (electrically erasable programmable read only memory), SRAM (static random access memory), SDRAM (synchronous dynamic random access memory), and Flash RAM (random access memory), and other special purpose logic devices such as ASICs (application specific integrated circuits) or configurable logic devices such GAL (generic array logic) and reprogrammable FPGAs (field programmable gate arrays).

Each computer may also include plural input devices (for example, keyboard, microphone, and mouse), and a display controller for controlling a monitor. Additionally, the computer may include a floppy disk drive; other removable media devices (for example, compact disc, tape, and removable magneto optical media); and a hard disk or other fixed high-density media drives, connected using an appropriate device bus such as a SCSI (small computer system interface) bus, an Enhanced IDE (integrated drive electronics) bus, or an Ultra DMA (direct memory access) bus. The computer may also include a compact disc reader, a compact disc reader/writer unit, or a compact disc jukebox, which may be connected to the same device bus or to another device bus.

The arrangement provides at least one computer readable medium. Examples of computer readable media include compact discs, hard disks, floppy disks, tape, magneto optical disks, PROMs (for example, EPROM, EEPROM, Flash EPROM), DRAM, SRAM, SDRAM.

Stored on any one or on a combination of computer readable media is software for controlling both the hardware of the computer and for enabling the computer to interact with other elements, to perform the functions described above. Such software may include, but is not limited to, user applications, device drivers, operating systems, development tools, and so forth.

Such computer readable media further include a computer program product including computer executable code or computer executable instructions that, when executed, causes a computer to perform the methods disclosed above. The computer code may be any interpreted or executable code, including but not limited to scripts, interpreters, dynamic link libraries, Java classes, complete executable programs, and the like.

From the foregoing, it will be apparent to those skilled in the art that a variety of methods, systems, computer programs on recording media, and the like, are provided.

The present disclosure supports a system for scheduling at least one job for execution on a network of nodes joined by links. The system may have (a) a job planner (160) including (a1) a validity portion configured to determine the nodes' ability to run the one or more jobs at a given time and (a2) a cost portion configured to determine costs to run the at least one job at respective nodes at a given time. The system may also have (b) a job scheduler (150) configured to cooperate with the validity portion and the cost portion so as to determine at least one optimum node that is able to run the at least one job and that has a lowest cost.

The system may also have a job metadata storage portion (162) configured to store job metadata for the at least one job; a node characteristics storage portion (132, 134) configured to store node characteristics; and a link characteristics storage portion (142, 144) configured to store link characteristics. The validity portion may be configured to determine a possible validity of a given node by comparing the job metadata with the node characteristics of the given node and the link characteristics.

The system may also have a node cost storage portion (136) configured to store node-specific cost data; and a link cost storage portion (146) configured to store link-specific cost data for combinations of job metadata, node(s), and link(s). The cost portion may be configured to determine a total cost based on the job metadata, the node-specific cost data, and the link-specific cost data.

The link-specific cost data (146) may include at least one from a group including at least one rate dependent on volume of bandwidth; at least one rate dependent on volume of data transported; at least one rate dependent on level of jitter; at least one rate dependent on dropped packets; and at least one rate dependent on network latency.

The node-specific cost data (136) may include at least one from a group including at least one rate dependent on processor utilization; and at least one rate dependent on storage utilization.

The job metadata (162) may include at least one cost function dependent on completion delay.

The system may also have a portion (150) configured to cause the at least one job to be run at the one or more nodes that are able to run the job at the lowest cost.

Each job may be associated with a job transport capacity requirement; all the costs may be set to zero so that the job scheduler (150) cooperates with the validity portion so as to determine at least one node that is able to run the at least one job; and the system may also have a link manager (140) configured to reserve at least some of the link capacity of at least one of the links connected to the one or more of the nodes where the job is scheduled, such that a resulting reserved link capacity matches or exceeds the job transport capacity requirement.

The nodes may include components having at least a capability and a predetermined capacity; the links may include channels having at least a capability and a predetermined capacity; and the system may also have a job schedule (150) configured to store a list of jobs to be run, and planned nodes and links to be at least partially utilized by each job over time; a job metadata storage portion (162) including, for each job, component capability and capacity requirements, link capability and capacity requirements, and job duration and deadline; a job submission portion (164) configured to receive the metadata; a node capability database (132) configured to maintain information about the capability and capacity of each component within the nodes; a node utilization table (134) configured to maintain information about a planned utilization of capacity of each component of the nodes in accordance with the job schedule (150); a node cost table (136) configured to maintain information on a cost of the capacity of each component at the nodes over time; a link capability database (142) configured to maintain information about a capability and capacity of each channel within the links; a link utilization table (144) configured to maintain information about a planned utilization of capacity of each channel of the one or more links in accordance with the job schedule (152); a link cost table (146) configured to maintain information on a cost of the capacity of each channel of the links over time; a node manager (130) configured to manage the node capability database (132), the node utilization table (134), and the node cost table (136), and to modify the node utilization table; a link manager (140) configured to manage the link capability database (142), the link utilization table (144), and the link cost table (146), and to modify the link utilization table; a job planner (160) that, when provided a new job and its associated metadata, is configured to communicate with the link manager (140) and the node manager (130) to determine whether there is at least one valid combination of nodes and links with the capability and capacity over time to complete the at least one job by the deadline; a job planner (160) that may include a cost module configured to select an optimal total cost combination of nodes and links from among the at least one valid combination of nodes and links with the capability and capacity over time to complete the job by the deadline; and a job scheduler (150) that, if there is at least one valid combination of node and links with the capability and capacity over time to complete the at least one job by the deadline; is configured to schedule the at least one job in accordance with the selected optimal total cost combination, and to communicate with the node manager (130) and link manager (140) to update the link utilization table (144) and the node utilization table (134) in accordance with the selected optimal total cost combination, and to update the job schedule (152), and to cause the at least one job to execute in accordance with the selected optimal total cost combination of nodes and links.

The present disclosure also supports a system for scheduling at least one job for execution on a network of nodes joined by links having respective link capacities, each job associated with a transport capacity requirement. The system may have a job scheduler (150) configured to schedule the at least one job to be executed on at least one selected node; and a link manager (140) configured to reserve at least some of the link capacity of at least one of the links connected to the at least one selected node, to match the job transport capacity requirement.

The system may also have a job planner (160) including a validity portion configured to determine the nodes' ability to run the one or more jobs at a given time; and the job scheduler (150) may be further configured to cooperate with the validity portion so as to determine the at least one selected node.

The system may also have a job planner (160) including a cost portion configured to determine costs to run the at least one job at respective nodes at a given time; and the job scheduler (150) may be further configured to cooperate with the cost portion so as to determine the at least one selected node to have a lowest cost.

The present disclosure further supports a method for scheduling at least one job for execution on at least one optimum node in a network of nodes connected by links. the method may involve (202) determining which nodes are capable of running the at least one job; (206) analyzing measures of total cost associated with execution of the at least one job on respective nodes that were determined to be capable of running the at least one job; and (207) based on a measure of least total cost, selecting the at least one optimum node for running the at least one job.

The method may also involve (208) scheduling the at least one job for execution; and (209) causing the at least one job to be run at the at least one optimum node.

The step (206) of analyzing measures of total cost, may include at least one from a group including: evaluating at least one rate dependent on volume of bandwidth; evaluating at least one rate dependent on volume of data transported; evaluating at least one rate dependent on level of jitter; evaluating at least one rate dependent on dropped packets; and evaluating at least one rate dependent on network latency.

The step (206) of analyzing measures of total cost, may include at least one from a group including: evaluating at least one rate dependent on processor utilization; and evaluating at least one rate dependent on storage utilization.

The step (206) of analyzing measures of total cost, may include evaluating at least one cost function dependent on completion delay.

Step (202) of determining which nodes are capable of running the at least one job may include determining a planned utilization of the links over time, limited by a capability and a capacity of the respective links; determining a planned utilization of the nodes over time, limited by a capability and a capacity of the respective nodes; determining zero or more candidate nodes having a capability and a capacity that meets or exceeds specified requirements of the at least one job; for each candidate node, determining link requirements over time on the links if the at least one job were run at that candidate node; determining whether the link requirements for each candidate node can be met, given the planned utilization of the links over time; and determining zero or more valid nodes to be those candidate nodes that allow link requirements to be met, while running the at least one job.

The step (207) of selecting the at least one optimum node, may include determining a total cost to run the job for each valid node; and selecting the at least one optimum node such that there is no other valid node with a lower total cost.

The method may also involve selecting a planned node from among the at least one optimum node; reserving at least a portion of a remaining capability and capacity of each of the links that are required to meet the specified requirements of the at least one job planned to run at the planned node; reserving at least a portion of a remaining capability and capacity of the planned node required to meet the requirements of the job; and causing the job to be executed at the planned node.

The present disclosure further supports a computer program product including computer executable code or computer executable instructions that, when executed, causes a at least one computer to perform the methods described herein.

The present disclosure further supports a system configured to perform the methods described herein.

Many alternatives, modifications, and variations will be apparent to those skilled in the art in light of the above teachings. While the present invention has been described with reference to one or more particular embodiments, those skilled in the art will recognize that many changes may be made thereto without departing from the spirit and scope of the present invention. For example:

The system may be implemented with elements organized and functioning in a way other than that specifically illustrated in FIG. 1A. For example, the job planner 160 and job scheduler 150 may be integrated into a single module; conversely, functions performed within a single block may be decomposed into plural blocks. Thus, the performance of the various functions may be distributed among elements differently from the examples disclosed above.

Costs may be ignored, but bandwidth reserved on demand, simply by setting all costs to zero. This may be done explicitly, or implicitly by removing the cost tables and costing steps from the system and method respectively. In any event, optimum nodes may or may not be determined while the bandwidth on demand (BoD) function is performed.

Jobs may be viewed as potentially resident at more than one node simultaneously (distributed application architecture, disk mirroring or tape backup and restore, etc.), wherein the system components and method steps would consider, in an alternate embodiment, various multi-node solutions.

Rather than explicitly considering each node, a sample of nodes, or those with the lowest utilization, or lowest cost, or combination of lowest cost or utilization may be considered, thus reducing the search time.

As jobs run, actual information may be used to upgrade forecast capacity requirements, and the job schedule updated accordingly.

Lower priority jobs may be dropped from the job schedule or delayed in accordance with a policy, to maximize the number of higher priority jobs successfully run.

Rather than considering node capability and capacity first and then link capability and capacity, the order may be reversed.

Rather than first generating a set of candidate nodes, and then reducing that set down to a set of valid nodes, each node may be considered in turn. If this is done, a minimal cost objective may be set which if a valid configuration is found meeting the cost objective, that configuration would be selected as satisfactory, if not in fact optimal.

Other embodiments and variations not specifically listed.

Each of these embodiments and variations thereof are contemplated as falling within the spirit and scope of the claimed invention, which is set forth in the following claims. It is therefore to be understood that within the scope of the appended claims and their equivalents, the invention may be practiced otherwise than as specifically described herein.

What is claimed is:

1. A system for scheduling a computer-executable job for execution by a network of nodes joined by links, the system comprising:
 a job planner to determine whether there is at least one valid combination of nodes and links with capability and capacity over time to complete the computer-executable job by a deadline, the job planner including:
  a validity portion to determine abilities of respective nodes to execute the computer-executable job at a given time; and
  a cost portion to determine costs to execute the computer-executable job at the respective nodes at the given time, the cost portion to select a total cost combination of nodes and links from among the at least one valid combination of nodes and links with the capability and capacity over time to complete the computer-executable job by the deadline; and a job scheduler to cooperate with the job planner to determine, via a processor, at least a first node from the network of nodes that is able to execute the computer-executable job and that has a lowest cost to execute the computer-executable job at the first node at the given time, the job scheduler to base its determination on compiled instructions comprising the computer-executable job.

2. The system of claim 1, further comprising:
a job metadata storage to store job metadata for the computer-executable job;
a node characteristics storage to store node characteristics; and
a link characteristics storage to store link characteristics, the validity portion to determine a possible validity of a given node by comparing the job metadata with the node characteristics of the given node and the link characteristics.

3. The system of claim 2, further comprising:
a node cost storage to store node-specific cost data; and
a link cost storage to store link-specific cost data for combinations of job metadata, node(s), and link(s), the cost portion to determine a total cost based on the job metadata, the node-specific cost data, and the link-specific cost data.

4. The system of claim 3, wherein the link-specific cost data includes at least one of:
at least one rate dependent on volume of bandwidth;
at least one rate dependent on volume of data transported;
at least one rate dependent on level of jitter;
at least one rate dependent on dropped packets; and
at least one rate dependent on network latency.

5. The system of claim 3, wherein the node-specific cost data includes at least one of:
at least one rate dependent on processor utilization; and
at least one rate dependent on storage utilization.

6. The system of claim 3, wherein the job metadata includes:
at least one cost function dependent on completion delay.

7. The system of claim 3, wherein the processor is to cause the computer-executable job to be executed at the first node.

8. A system for scheduling a computer-executable job for execution by a network of nodes joined by links, the system comprising:
a job planner including:
    a validity portion to determine abilities of respective nodes to execute the computer-executable job at a given time; and
    a cost portion to determine costs to execute the computer-executable job at the respective nodes at the given time, the cost portion to select a total cost combination of nodes and links from among at least one valid combination of nodes and links with capability and capacity over time to complete the computer-executable job by a deadline; and
a job scheduler to cooperate with the validity portion and the cost portion to determine, via a processor, at least a first node from the network of nodes that is able to execute the computer-executable job and that has a lowest cost to execute the computer-executable job at the first node at the given time, wherein:
    the computer-executable job is associated with a job transport capacity requirement;
    all the costs are set to zero so that the job scheduler cooperates with the validity portion to determine at least one node that is able to execute the computer-executable job; and
    the system further comprises a link manager to reserve at least some of the link capacity of at least one of the links connected to the one or more of the nodes where the computer-executable job is scheduled, such that a resulting reserved link capacity matches or exceeds the job transport capacity requirement.

9. A system for scheduling a computer-executable job for execution by a network of nodes joined by links, the system comprising:
a job planner including:
    a validity portion to determine abilities of respective nodes to execute the computer-executable job at a given time; and
    a cost portion to determine costs to execute the computer-executable job at respective nodes at the given time; and
a job scheduler to cooperate with the validity portion and the cost portion to determine, via a processor, at least a first node that is able to execute the computer-executable job and that has a lowest cost to execute the computer-executable job at the first node at the given time, wherein:
the nodes include components having at least a capability and a capacity;
the links include channels having at least a capability and a capacity; and
the system further comprises:
a job schedule to store a list of computer-executable jobs to be executed, and planned nodes and links to be at least partially utilized by each computer-executable job over time;
a job metadata storage including, for each computer-executable job, component capability and capacity requirements, link capability and capacity requirements, and job duration and deadline;
a job submission portion to receive the metadata;
a node capability database to maintain information about the capability and capacity of each component within the nodes;
a node utilization table to maintain information about a planned utilization of capacity of each component of the nodes in accordance with the job schedule;
a node cost table to maintain information on a cost of the capacity of each component at the nodes over time;
a link capability database to maintain information about a capability and capacity of each channel within the links;
a link utilization table to maintain information about a planned utilization of capacity of each channel of the one or more links in accordance with the job schedule;
a link cost table to maintain information on a cost of the capacity of each channel of the links over time;
a node manager to manage the node capability database, the node utilization table, and the node cost table, and to modify the node utilization table;
a link manager to manage the link capability database, the link utilization table, and the link cost table, and to modify the link utilization table;
the job planner, when provided a new computer-executable job and its associated metadata, is to communicate with the link manager and the node manager to determine whether there is at least one valid combination of nodes and links with the capability and capacity over time to complete the computer-executable job by the deadline, wherein the cost portion is to select a total cost combination of nodes and links from among the at least one valid combination of nodes and links with the capability and capacity over time to complete the computer-executable job by the deadline; and the job scheduler, if there is at least one valid combination of node and links with the capability and capacity over time to complete the computer-executable job by the deadline, is to schedule the computer-executable job in accordance with the selected total cost combination, and to communicate with the node manager and link manager to update the link utilization table and the node utilization table in accordance with the selected total cost combination, to update the job schedule, and to cause the computer-executable job to execute in accordance with the selected total cost combination of nodes and links.

10. A system for scheduling a computer-executable job for execution by a network of nodes joined by links having respective link capacities, the computer-executable job associated with a transport capacity requirement, the system comprising:

a job planner to determine whether there is at least one valid combination of nodes and links with capability and capacity over time to complete the computer-executable job by a deadline, wherein the job planner is to select a total cost combination of nodes and links from among the at least one valid combination of nodes and links with the capability and capacity over time to complete the computer-executable job by the deadline;

a job scheduler to schedule the computer-executable job, via a processor, to be executed on at least one selected node, the job scheduler to base its determination on compiled instructions comprising the computer-executable job; and a link manager to reserve at least some of the link capacity of at least one of the links connected to the at least one selected node from the network of nodes, to match the job transport capacity requirement.

11. The system of claim 10, further comprising:

a validity portion of the job planner to determine the nodes' respective abilities to execute the computer-executable job at a given time, the job scheduler to cooperate with the validity portion to determine the at least one selected node.

12. The system of claim 10, further comprising:

a cost portion of the job planner to determine costs to execute the computer-executable job at respective nodes at a given time, the job scheduler to cooperate with the cost portion to determine the at least one selected node to have a lowest cost.

13. A method for scheduling a computer-executable job for execution on at least one selected node from a network of nodes connected by links, the method comprising:

determining combinations of nodes and links that have capability and capacity over time to complete the computer-executable job by a deadline;

analyzing measures of total cost associated with execution of the computer-executable job on respective combinations of nodes and links that were determined to have the capability and capacity over time to complete the computer-executable job by the deadline;

based on a measure of least total cost associated with execution of the computer-executable job on the respective combinations of nodes and links, selecting the at least one selected node from the network of nodes for executing the computer-executable job, the selection based on compiled instructions comprising the computer-executable job;

scheduling the computer-executable job for execution; and causing the computer-executable job to be executed at the at least one selected node.

14. The method of claim 13, wherein the analyzing measures of total cost, includes at least one of:

evaluating at least one rate dependent on volume of bandwidth;

evaluating at least one rate dependent on volume of data transported;

evaluating at least one rate dependent on level of jitter;

evaluating at least one rate dependent on dropped packets; and evaluating at least one rate dependent on network latency.

15. The method of claim 13, wherein the analyzing measures of total cost, includes at least one of:

evaluating at least one rate dependent on processor utilization; and evaluating at least one rate dependent on storage utilization.

16. The method of claim 13, wherein the analyzing measures of total cost, includes:

evaluating at least one cost function dependent on completion delay.

17. A method for scheduling a computer-executable job for execution on at least one selected node from a network of nodes connected by links, the method comprising:

determining which nodes are capable of executing the at least one computer-executable job;

analyzing measures of total cost associated with execution of the computer-executable job on respective nodes that were determined to be capable of executing the computer-executable job; and based on a measure of least total cost associated with execution of the computer-executable job on the respective nodes, selecting the at least one selected node from the network of nodes for executing the computer-executable job, wherein the determining which nodes are capable of executing the computer-executable job includes:

determining a planned utilization of the links over time, limited by a capability and a capacity of the respective links;

determining a planned utilization of the nodes over time, limited by a capability and a capacity of the respective nodes;

determining zero or more candidate nodes having a capability and a capacity that meets or exceeds specified requirements of the computer-executable job;

for each candidate node, determining link requirements over time on the links if the computer-executable job were executed at that candidate node;

determining whether the link requirements for each candidate node can be met, given the planned utilization of the links over time; and determining zero or more valid nodes to be those candidate nodes that allow link requirements to be met, while executing the computer-executable job.

18. The method of claim 17 wherein the selecting the at least one selected node, includes:

determining a total cost to execute the computer-executable job for each valid node; and selecting the at least one selected node such that there is no other valid node with a lower total cost.

19. The method of claim 18, further comprising:

selecting a planned node from among the at least one selected node;

reserving at least a portion of a remaining capability and capacity of each of the links that are required to meet the specified requirements of the computer-executable job planned to be executed at the planned node;

reserving at least a portion of a remaining capability and capacity of the planned node required to meet the requirements of the computer-executable job; and causing the computer-executable job to be executed at the planned node.

20. An apparatus comprising:

a memory storing machine readable instructions; and a processor to execute the instructions to perform operations comprising:

determining abilities of respective nodes to execute a computer-executable job at a given time;

determining whether there is at least one valid combination of nodes and links with capability and capacity over time to complete the computer-executable job by a deadline;

determining costs to execute the computer-executable job at the respective nodes at the given time;

selecting a total cost combination of nodes and links from among the at least one valid combination of nodes and links with the capability and capacity over time to complete the computer-executable job by the deadline; and     scheduling the computer-executable job for execution on at least a first node from the network of nodes that is able to execute the computer-executable job and that has a lowest cost to execute the computer-executable job at the first node at the given time, the scheduling of the computer-executable job for execution on the at least the first node being based on compiled instructions comprising the computer-executable job.

21. The apparatus of claim 20, wherein the operations further comprise determining a possible validity of a given node by comparing job metadata of the computer-executable job with node characteristics of the given node and link characteristics.

* * * * *